C. L. CASSADY.
HAT PIN PROTECTOR.
APPLICATION FILED AUG. 6, 1912.
1,060,427.
Patented Apr. 29, 1913.
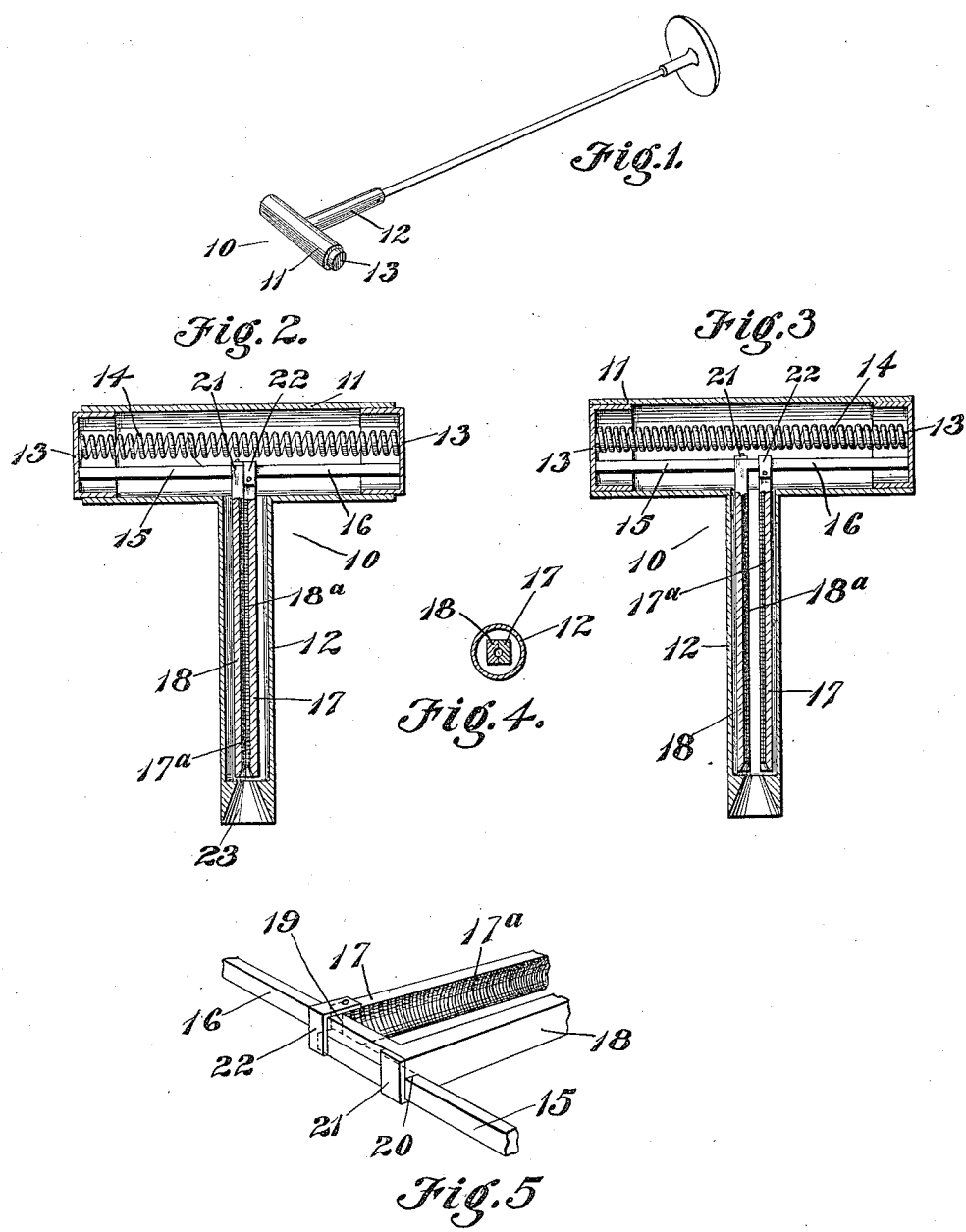

UNITED STATES PATENT OFFICE.

CHARLES L. CASSADY, OF RODEO, NEW MEXICO.

HAT-PIN PROTECTOR.

1,060,427.  Specification of Letters Patent.  Patented Apr. 29, 1913.

Application filed August 6, 1912. Serial No. 713,591.

*To all whom it may concern:*

Be it known that I, CHARLES L. CASSADY, a citizen of the United States, residing at Rodeo, in the county of Grant and State of New Mexico, have invented new and useful Improvements in Hat-Pin Protectors, of which the following is a specification.

An object of the invention is to provide a device for inclosing the pointed ends of hat pins to prevent persons from being injured thereby.

The invention embodies, among other features, a device consisting of an ornamentally designed casing, preferably made of an integral piece of material, the said casing being suitably fashioned in metal or some other substance with manually operative means for rigidly securing the casing to a hat pin to inclose the point of the hat pin and prevent persons from being injured by the hat pin when in close proximity thereto.

In the further disclosure of the invention reference is to be had to the accompanying drawings constituting a part of this specification in which similar characters of reference denote corresponding parts in all the views, and in which:

Figure 1 is a perspective view of a hat pin showing my device applied thereto; Fig. 2 is a longitudinal sectional view of the device showing the gripping members in gripping position; Fig. 3 is a similar sectional view showing the gripping members in open position; Fig. 4 is a horizontal sectional view taken on the line 4—4 in Fig. 2; and Fig. 5 is a perspective view of the gripping members.

Referring more particularly to the views, use is made of a casing 10 preferably formed of an integral piece of material to constitute a plurality of cylindrical casing members 11, 12, the casing member 11 being arranged laterally with respect to the casing member 12.

The ends of the casing member 11 are open and mounted to slidably extend therein are operating knobs 13 having the ends of an expansible helical spring 14 rigidly secured thereto. A bar 15 has an end thereof rigidly secured to the inner face of one of the knobs 13 and a bar 16 has an end of the knobs 13 and a bar 16 has an end thereof rigidly secured to the inner face of the other knob 13, the said bars 15, 16 being mounted in the casing member 11, the said bars being bent laterally at their inner ends to form gripping members 17, 18 respectively, the mentioned gripping members being arranged to extend longitudinally in the casing member 12 and having their inner faces concave and preferably serrated to form gripping faces 17$^a$, 18$^a$.

The gripping member 17 is cut away at the upper end to form a seat 19 on which the bar 16 is adapted to slide, the mentioned seat being slightly offset from the vertical plane of the gripping member and the gripping member 18 is cut away at the upper end to form a seat 20 on which the bar 15 is adapted to slide, the mentioned seat 20 being offset in the opposite direction to the seat 19 and out of the vertical plane of the gripping member 18. A collar 21 is mounted to encircle the bar 15 and the bar 16 adjacent the upper end of the gripping member 18, the said collar being rigidly secured to the bar 16. In a similar manner, a second collar 22 is mounted to encircle the bar 15 and the bar 16 adjacent the upper end of the gripping member 17, the mentioned collar 22 being rigidly secured and movable with the bar 15, thus providing suitable means for guiding the bars 15 and 16 to prevent the same from becoming removed from the seats 19, 20. The free ends of the gripping members 17, 18 are preferably beveled as shown, and the opening 23 in the free end of the casing member 12 is also provided with a beveled wall so that the hat pin can be more readily received in the casing member 12 and more readily received between the gripping members 17, 18.

Referring to the views, it will be readily seen that when the device is in normal position the expansible action of the spring 14, tending to press the knobs 13 outwardly from the casing member 11, will hold the gripping members 17, 18 in closed position and when it is desired to connect the device to the pointed end of a hat pin 24, the fingers are placed on the knobs 13 and the knobs are pressed inwardly against the expansible action of the spring 14, thus causing the bars 15, 16 to slide on the respective seats 20, 19 so that the gripping members 17, 18 will be moved apart to receive the pointed end of the hat pin 24 therebetween, it being readily understood that the gripping members will, at all times, remain in parallel relation and that as soon as the pressure is released on the knobs 13 the action of the spring 14 will press the knobs 13 outwardly, thus moving the gripping members 17, 18 into closed position so that the serrated gripping faces 17ª, 18ª of the gripping members will securely grip the hat pin, the pointed end of which will be inclosed within the casing 10.

As mentioned heretofore, the device may be fashioned of any desirable material and if desired the casing 10 can be studded with jewels or stones, thus presenting a structure which will not only perform the functions described herein but will also present a neat and effective ornamentation for the hat.

Having thus described my invention, I claim:

1. In a device of the class described, the combination with a casing consisting of a tubular casing member and a second tubular casing member, of an expansible spring mounted in the first tubular member, knobs mounted to slide in the first tubular member and having the ends of the said spring secured thereto, bars each having an end thereof rigidly secured to one of the said knobs respectively, gripping members extending laterally from the said bars and arranged to extend into the second tubular member, seats formed on the said gripping members and adapted to slidably receive the said bars, and collars mounted to encircle the said bars to retain the said gripping members in parallel relation, the said gripping members being movable into open position when pressure is exerted on the outer faces of the said knobs.

2. In a device of the class described, the combination with a casing, of knobs slidably mounted thereon, a spring engaging the knobs to normally retain the same in normal position on the said casing, bars each having an end thereof secured to one of the said knobs respectively, gripping members formed with the said bars and arranged in parallel relation, the inner faces of the gripping members being concave, and seats formed on the said gripping members and having the said bars mounted to slide thereon so that the said gripping members will be moved into open position when pressure is exerted on the outer faces of the said knobs.

In testimony whereof I affix my signature in presence of two witnesses.

CHARLES L. CASSADY.

Witnesses:
J. E. HARRISON,
R. E. DOUGHTY, Jr.

---

Copies of this patent may be obtained for five cents each, by addressing the "Commissioner of Patents, Washington, D. C."